(12) United States Patent
Lamping (10) Patent No.: US 7,140,007 B2
(45) Date of Patent: Nov. 21, 2006

(54) ASPECT-ORIENTED PROGRAMMING WITH MULTIPLE SEMANTIC LEVELS

(75) Inventor: John O. Lamping, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 617 days.

(21) Appl. No.: 10/046,200

(22) Filed: Jan. 16, 2002

(65) Prior Publication Data

US 2003/0149959 A1  Aug. 7, 2003

(51) Int. Cl.
*G06F 9/45* (2006.01)
(52) U.S. Cl. ............... 717/154; 717/140; 717/141; 717/159; 717/160
(58) Field of Classification Search ............... 717/114, 717/136–161
See application file for complete search history.

(56) References Cited

U.S. PATENT DOCUMENTS

| 3,781,814 | A | * | 12/1973 | Deerfield | 712/200 |
| 5,822,593 | A | * | 10/1998 | Lamping et al. | 717/161 |
| 6,018,625 | A | | 1/2000 | Hayball et al. | |
| 6,233,610 | B1 | | 5/2001 | Hayball et al. | |
| 6,467,086 | B1 | * | 10/2002 | Kiczales et al. | 717/165 |
| 6,539,390 | B1 | * | 3/2003 | Kiczales et al. | 707/101 |
| 6,745,384 | B1 | * | 6/2004 | Biggerstaff | 717/156 |
| 2001/0007976 | A1 | * | 7/2001 | Thompson et al. | 705/7 |

OTHER PUBLICATIONS

'Aspect-Oriented Programming', Kiczales et al. ECOOP Finland, Jun. 1997.*
'Workshop on Compositional Software Architectures' AMC SIGSOFT, Feb. 1998.*
Grundy "Aspect-oriented Requirements Engineering for Component-based Software Systems", Jun. 1999, 4th IEEE Symposium on Requirements Engineering.*

\* cited by examiner

*Primary Examiner*—Kakali Chaki
*Assistant Examiner*—Jason Mitchell
(74) *Attorney, Agent, or Firm*—Oliff & Berridge, PLC (57) ABSTRACT

Techniques that allow the operations of a program to be intercepted and intervened with are known. These techniques are restricted by the same limited view of the program's data that is currently available at a base level of an object or method. Some aspects need access to more information about the program's data of one or more objects than is available at the base level. An aspect of aspect-oriented programming systems, methods and environments examines the results of a computation at one stage. That aspect affects only subsequent stages of the computation, so that no circularity exists. Custom flow analyses, whether local or global, can also be performed at each stage to propagate non-local information. "Macro" style programming can be reduced or avoided, as programming can be facilitated in terms of manipulating the results of various computational stages instead of in terms of manipulating blocks of code.

8 Claims, 7 Drawing Sheets

```
1   (stage requested-loops)
2   (projection key :defined-on requested-loops)
3   (projection computing-loop :defined-on requested-loops)
4   (define test
5     (lambda (x y z)
6        (and! (and! X y) z)))
7   (define and!
8     (reduction-stage requested-loops
9       (lambda (arg1 arg2)
10         (pointwise #'and arg1 arg2))))
11  (propagator requested-loops :bottom-up
12    (lambda (term)
13      (case requested-loops term
14        ((pointwise op arg1 arg2) (op arg1 arg2)
15         (let ((starting-loop
16                (fuse-loops (get-or-make-loop arg1) (get-or-make-loop arg2))
17                (my-key (gensym)))
18           (deconstruct requested-loops starting-loop
19             (ptw-loop fn inputs outputs) (fn inputs outputs)
20             (let* ((new-fn (reduction-stage computation
21                     (lambda (args)
22                       (let* ((temp (fn args))
23                              (result
24                                (op (find (key arg1) temp)
25                                    (find (key arg2) temp))))
26                         (cons (cons my-key result)
27                               temp))))
28                    (new-loop (defer (ptw-loop new-fn inputs outputs))))
29               (update (key value) my-key)
30               (update (computing-loop value) new-loop))
31             (if (computing-loop arg1)
32                 (update (computing-loop arg1)
33                         (defer (loop-reference value))))
34             (if (computing-loop arg2)
35                 (update (computing-loop arg2)
36                         (defer (loop-reference value)))))))
37        (else (note-demands value))
38        )))
39
```

*FIG. 3A*

```
39      (define get-or-make-loop (value)
40        (if (and (same-frequency value) (computing-loop value))
41            (get-loop value)
42            (defer (ptw-loop
43                    (reduction-stage computation
44                      (lambda (args) args)
45                    (list (cons (key value) value))
46                   nil))))

47      (define get-loop
48        (reduction-stage computation
49          (lambda (value)
50            (computing-loop (get-loop-location value))))
51      (define get-loop-location
52        (reduction-stage computation
53          (lambda (value)
54            (case requested-loops (computing-loop value)
55              ((loop-reference next) (next)
56               (get-loop-location next))
57              (else value))))
58      (define note-demands (value)
59        (case requested-loops value
60          ((fn . args) (fn args)
61           (record-demand fn)
62           (map args #record-demand))
63          ((case stage value (pattern vars body) (else otherwise))
64           (stage value pattern vars body otherwise)
65           (record-demand value)
66           (record-demand body)
67           (record-demand otherwise))
68          ((lambda vars body) (vars body)
69           (record-demand body))))
70      (define record-demand (value)
71        (if (computing-loop value)
72            (let ((place (get-loop-location value))
73                  (key (key value)))
74              (case requested-loops (computing-loop place)
75                ((ptw fn inputs outputs) (fn inputs outputs)
76                 (if (not (member key outputs))
77                     (let ((new-outputs (cons key outputs)))
78                       (update (computing-loop place)
79                         (delay (ptw fn inputs new-outputs)))))))))
80
```

*FIG. 3B*

```
80      (define ptw-loop
81        (lambda (fn inputs outputs)
82          (let ((output-pairs (early-mapcar (reduction-stage computation
83                                      (lambda (key) (cons key (new-array)))
84                                      outputs))))
85            (dotimes ((i 0 99))
86              (let* ((input-scalars
87                        (early-mapcar (reduction-stage computation
88                                      (lambda (pair)
89                                        (let ((key (first pair))
90                                              (array (second pair)))
91                                          (cons key (elt array i)))
92                                      inputs))
93                     (output-scalars (fn input-scalars)))
94                (early-map (reduction-stage computation
95                              (lambda (pair)
96                                (let ((key (first pair))
97                                      (array (second pair)))
98                                  (setf (elt array i)
99                                        (find key output-scalars))))
100                           output-pairs))))))
101     (define pointwise (fn op1 op2 > result)
102       (reduction-stage computation ;; inlineable after loop fusion
103         (find (key result) (get-loop result))))
104     (define fuse-loops
105       (lambda (loop1 loop2)
106         (if (stage-eq requested-loops loop1 loop2)
107             loop1
108             (deconstruct loop-structure loop1
109               ((ptw-loop fn1 inputs1 outputs1) (fn1 inputs1 outputs1)
110                (deconstruct loop-structure loop2
111                  ((ptw-loop fn2 inputs2 outputs2) (fn2 inputs2 outputs2)
112                    (let ((inputs (merge inputs1 inputs2))
113                          (outputs (append outputs 1 outputs2)))
114                      (ptw-loop
115                        (preserves computation
116                          (lambda (inputs) (merge (fn1 inputs) (fn2 inputs)))
117                          inputs outputs)))))))))
118     (define find
119       (reduction-stage computation ;; inlineable after loop fusion
120         (lambda (id list)
121           (deconstruct computation list
122             (cons (cons key value) rest) (key value rest)
123             (if (stage-eq computation key id)
124                 value
125                 (find id rest))))))
126     (define merge
127       ... like find
```

ASPECT-ORIENTED PROGRAMMING WITH MULTIPLE SEMANTIC LEVELS

This invention was made with Government support under Contract F30602-97-C-0246 awarded by the Air Force. The Government has certain rights in this invention.

BACKGROUND OF THE INVENTION

1. Field of Invention

This invention is directed to methods and systems for aspect-oriented programming using a general purpose semantic-invariant construct language.

2. Description of Related Art

Currently, a primary concept in organizing complex software systems is the object-oriented programming paradigm. The idea behind object-oriented programming is to break down software systems into small modular units, such as classes, objects, methods (i.e., functions), and the like. In this way, programs can be more easily understood and debugged. Each modular unit can be separately created, tested and perfected without the programmer worrying about problems involving the other parts of the software system. Essentially, object-oriented programming compartmentalizes software system development.

When compiled, the modular units used in object-oriented programming roughly correspond to separate blocks of code. Since these blocks of code are executed without regard to the structure of other blocks, needless redundant operations often occur. For example, an object may do an addition operation and then a multiplication operation on a vector of operands. In the object-oriented programming paradigm, this would probably be accomplished using separate methods, one for addition and one for multiplication, both involving the use of arrays. First, the addition operands would be read in from the arrays. Then, the addition method would execute and store its results in an intermediate array. Subsequently, the multiplication method would execute and read in the addition method's results. Then, it would perform the multiplication and store the results in a third array. In this simple example, there were four read or write operations to the arrays.

If the addition and multiplication methods could "talk" to one another, the number of read and writes operation could be reduced. Furthermore, the multiplication method must wait for the addition method to complete before it can do anything. The multiplication method cannot take the first result of the addition operation and perform its multiplication operation. The multiplication method has to wait for all of the additions to finish, even though the final result would be the same. Thus, if methods were able to "talk" to one another, the overall speed of the software system can be increased. Some large software systems that are time dependent could greatly benefit from methods "talking" to one another.

Aspect-oriented programming is a new programming paradigm that essentially enables the desired ability for the methods to cross-communicate. Aspect-oriented programming allows programmers to use abstraction and decomposition to break apart large problems into smaller, more manageable subparts, similar to object-oriented programming. However, problems are broken down according to aspectual decomposition, instead of functional decomposition. Aspects facilitate the "talking" among methods. Additionally, aspects can "talk", or crosscut with each other, resulting in crosscut executables. This avoids the relatively isolated blocks of code that slows down the execution of current object-oriented programming code.

SUMMARY OF THE INVENTION

Various existing general purpose aspect-oriented programming techniques allow the operations of a base program to be intercepted and intervened with. However, these techniques are constrained in that they are restricted by the same limited view of the program's data that is currently available at a base level of an object or method.

Some aspects need access to more information about the program's data of one or more objects than is available at the base level. An aspect that wants to do loop fusion, for example, needs to see not just the result of a loop, as the base object would. Rather, such an aspect also needs to see the loop behind that result, so that aspect has a chance to implement the fusion. An aspect that wants to automatically do notification of changes needs to see not only the computational result, but also what the inputs to the computation were, so that aspect can be set up to receive notifications of any changes to those inputs. If an aspect wants to choose a data representation for a collection that will efficiently support the actual operations that will be done on the collection, then that aspect needs to see those operations. U.S. Pat. No. 5,882,593, which is incorporated herein by reference in its entirety, discusses loop fusion in greater detail.

It is apparent, in the context of the aspect-oriented programming examples illustrated above, that, in many desired implementations, there is an apparent difficulty in implementing conventional aspect-oriented programming techniques because of the apparent circularity of an aspect's objective and its requirements. That is, in these examples, the particular aspect needs to access the computation to obtain the data that the aspect needs. However, the aspect itself affects the computation. In other words, the aspect, to perform its operations, needs to look at something with the object or module that will be at least partly determined by what the aspect subsequently does to that object or module. Therefore, the inventors have recognized a need for methods or systems that resolve issues related to the difficulty of effectively implementing aspect-oriented programming.

This invention provides methods and systems for aspect-oriented programming that addresses the difficulties in implementing conventional aspect-oriented programming.

This invention separately provides systems, methods and an aspect-oriented programming language that enables multiple semantic levels within a program, module or object.

This invention separately provides systems, methods and an aspect-oriented programming language that reduces circularity issues.

This invention separately provides systems, methods and an aspect-oriented programming language that breaks down a function or operation into multiple stages.

Each operation of a function, expression, statement or other construct], which will be generally referred to herein as a computation, is interpreted as potentially comprising several stages. The overall computation is operated on in stages, with each stage ending when the computation has been completed up to that stage.

An "aspect" is a distinct set of code in an aspect-oriented program in the same manner that an object is a distinct set of code in an object-oriented program. In various exemplary embodiments of the systems, methods and aspect-oriented programming language environments according to this invention, an aspect examines the results of the computation at one stage. That aspect affects only subsequent stages of the computation, so that no circularity exists. Custom flow analyses, whether local or global, can also be performed at each stage to propagate non-local information. Furthermore, "macro" style programming can be reduced or avoided, as programming can be facilitated in terms of manipulating the results of various computational stages instead of in terms of manipulating blocks of code.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIGS. 3A–3C are an exemplary pseudo-code listing of a program for accomplishing loop fusion using the systems and methods according to this invention;

DETAILED DESCRIPTION OF PREFERRED EMBODIMENTS

Figure 1:
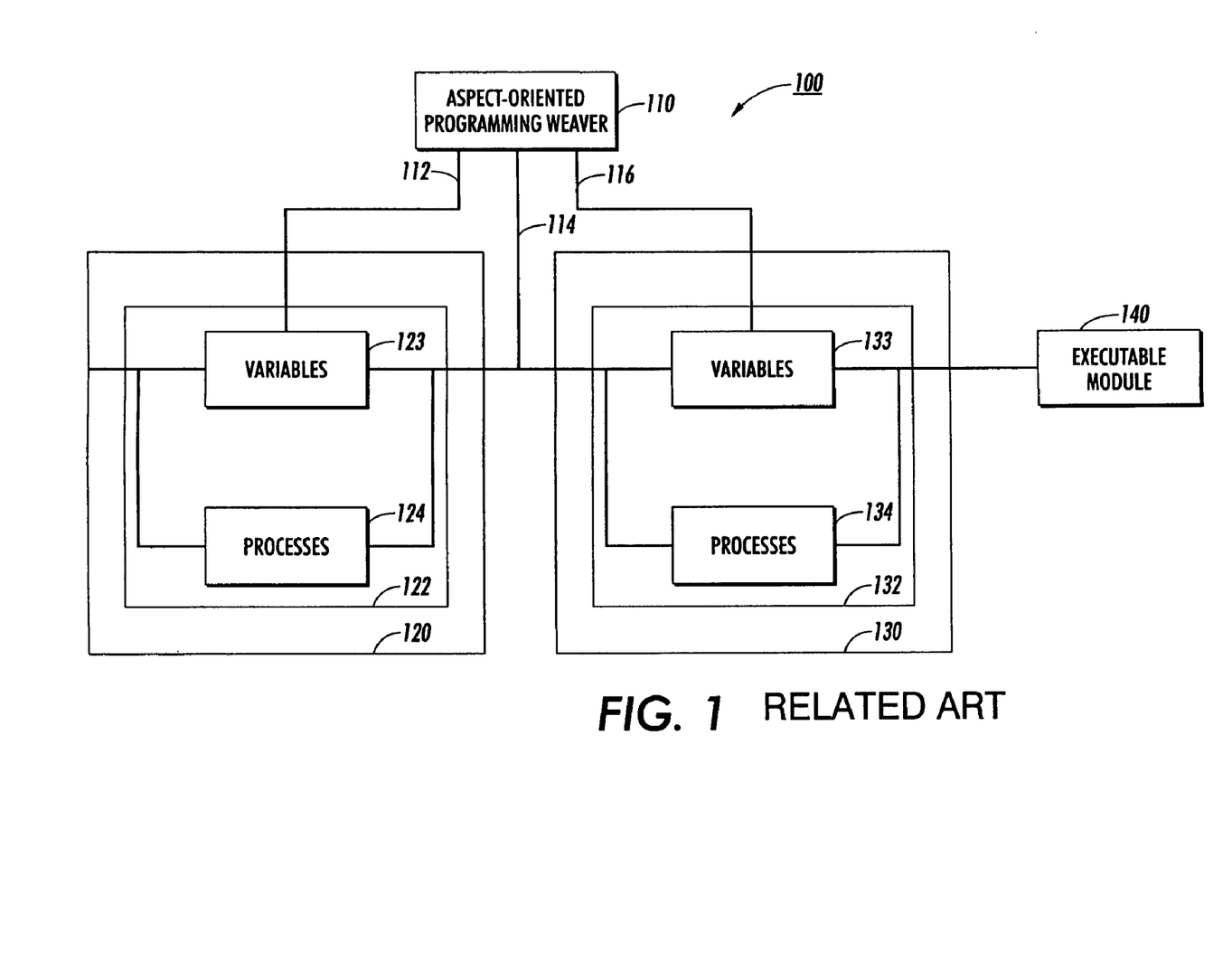
FIG. 1 illustrates a conventional relationship between programming elements in a convention aspect-oriented environment.

FIG. 1 illustrates one exemplary embodiment of a conventional aspect-oriented programming environment 100. FIG. 1 specifically illustrates how programming elements are converted into executable software modules using conventional aspect-oriented programming languages. As shown in FIG. 1, one or more high-level computer programming elements 120 are provided to an aspect-oriented weaver 110. The aspect-oriented weaver 110 in the aspect-oriented programming environment 100 compiles each of the high level computer program elements 120 into one or more executable modules. The aspect-oriented weaver 110 can either be static or dynamic. An automatic aspect-oriented weaver 110 implements a static weaving process. A static weaving process modifies the high-level programming elements 120, such as class source code, by inserting aspect-specific statements at join points in such high-level programming elements 120. Essentially, the aspect-oriented weaver 110 in-lines the desired aspect code into the classes. This results in highly-optimized woven code.

FIG. 1 shows one or high-level programming elements 120 that are input into the aspect-oriented weaver 110 of the general purpose aspect-oriented programming language environment 100. In a first stage, the aspect-oriented weaver 110 creates the woven, or intermingled, code. As shown in FIG. 1, a programming block 122 from one of the high level computer programming elements 120 is broken down into variables 123, and one or more processes or methods 124 that act on one or more of the variables 123. Then, the aspect-oriented weaver 110 examines that programming block 122 and determines where the one or more variables 123 overlap within the one or more various processes 124 of that programming block 122. Then, the aspect-oriented weaver 110 combines, or "weaves", the code to create an intermingled source code block 130.

In the second stage of the weaving process, the combined, or woven, program code block 130 is compiled into one or more executable modules 140. As shown in FIG. 1, in this second stage, the aspect-oriented weaver 110 takes one of the woven code blocks 130. The aspect-oriented weaver 110 compiles the woven variables 133 and the woven processes 134 of that woven code block 130 into one or more executable modules 140.

In various exemplary embodiments, the systems and methods according to this invention operate on a language based on the lambda calculus, such as the Scheme language, described in "The Structure and Interpretation of Computer Programs", by Ableson, Sussman and Sussman. In this language, the fundamental operations are function creation and function application. A function is created with a lambda expression, typically of the form "lambda (var*) exp". For example, the expression "lambda (x y)(+(*2 x)y)" defines the function which doubles its first argument and then adds the doubled first argument to its second argument. The "exp" portion is called the body of the lambda expression, and the var*" portions are called its arguments. A function is applied with an application expression, of the form "fn arg*", where "fn" denotes the function to be applied, and "arg*" is its arguments. The "fn" portion can either be a lambda expression, as in "(lambda(x y)(+(*2 x)y)) 3 4", or it can be any expression that evaluates to a function. Computation proceeds by reducing the applications of lambda expressions. Reducing lambda expressions generally occurs by substituting their arguments for the occurrences of their variables. For example, the above expression reduces to "+(*2 3)4)". This reduction operation is also known as unfolding.

Programming languages are built around the idea of an expression's value. Program modules execute essentially by converting expressions to values, because values can be passed around during execution of the program modules but the expressions can not. For example, a procedure call transmits the values of the arguments of the calling module to the formals of the procedure. Similarly, a variable assignment binds the variable to the value of the right hand side of the assignment. In any case, variables get bound to values, not to the expressions that gave rise to those values. The expression gets evaluated before the variable gets bound and subsequent references to the variable are able to access only the value. Taking the value of an expression is an abstraction operation. That is, taking the value of an expression throws away information about how the expression gave rise to the value, leaving just the value.

However, the inventors have discovered that, in aspect-oriented programming, sometimes some other emergent entity related to how the value was computed or determined, and not just the determined or computed value, is a critical element of information. For example, in the case of loop fusion, for a fusible function, the critical information is how the function's arguments are described in terms of loops. When this critical information is available, the opportunity to create a fused loop is present. In short, the inventors have recognized that it is not always enough to provide a function of a programming element with just the value of the arguments of the function, because some emergent entities, that are thrown away by the value abstraction, may be critical information.

One alternative is to bind variables to expressions, instead of to values. However, this goes too far in the opposite direction, to what is effectively a macro system. At this point, the programming language execution is not licensed to do anything. In this model, a variable does not even denote the expression it is bound to because the variable itself is an expression, which must not be evaluated in such a model. This model thus fails in two ways. First, the programmer must explicitly request values whenever such values are wanted. Second, when the programmer does want more information than the value, the programmer is provided with the entire expression, which often buries the desirable critical information in obscuring detail.

The inventors of this invention have determined that what is needed is a programming language, or programming language environment, that preserves just the right kind of information for a program block, and simplifies the rest of the information for that program block. Of course, according to this invention, what is "just right" will vary depending on what program element is using the information. For example, one procedure might need just the values of its arguments, while another procedure needs more information. When more information than just the value is needed, the systems, methods and aspect-oriented programming environments according to this invention should only provide the information that is needed. The systems, methods and aspect-oriented programming environments according to this invention should not provide unnecessary information that could cause unnecessary distinctions. The systems, methods and aspect-oriented programming environments according to this invention should provide something resembling a value as much as possible, while the "something" that is provided contains the desired additional information.

Sometimes, when evaluating an expression, only the value is wanted, but other times more information is needed. For example, sometimes only an array that is the result of a loop is wanted, while at other times it may be significant to know that the array is a result from a particular loop or function. In other words, sometimes the expression means an array, and sometimes it means something more than just an array. In the semantic-based aspect-oriented programming systems, methods and programming environments according to this invention, each of these possible meanings is called a significance of the expression. The value of an expression is the least informative significance. Any others significances will capture more information than the information captured by the value.

The semantic-based aspect-oriented programming systems, methods and programming environments according to this invention turns the notion of significance into something that computations can operate over. In the semantic-based aspect-oriented programming systems, methods and programming environments according to this invention, the computational process can be viewed as simplifying an expression until the expression has been reduced to a canonical representation of its significance. For example, determining the value of "(1+2)*4" simplifies first to "3*4", and then to "12", which is the canonical representation of the number twelve, the value of the expression. Of course, efficient implementations avoid explicitly constructing each intermediate expression, but the work such implementations do is analogous to the work of going between successive intermediate expressions.

Each step of the computation is valid because it preserves the final significance of the result. The difference between two significances is that the two significances will not authorize the same simplification steps.

Based on this observation, this invention implements systems, methods and programming environments that recognize that the only difference between any two significances is which computational simplification steps are authorized by those two significances. This means that determining an expression's significance is equivalent to performing the computational simplifications authorized by that significance. Furthermore, if a number of significances are ordered from more informative to less informative, then one can determine those significances in sequence. This involves first performing those simplifications authorized by the most informative significance, then performing the simplifications authorized by the next most informative significances, and so on.

It should be appreciated that this assumes that the requested significances of any particular expression will be totally ordered. It should be appreciated that a total order on all significances is not required, because allowing independently written libraries to introduce their own significances and being able to use these introduced significances in that program, is desirable. As a result, every significance will have a corresponding stage of processing. Accordingly, a computation will correspond to simplifying an expression through successive stages, each stage being a canonical representation of the expression for a successive significance.

The semantic-based aspect-oriented programming systems, methods and programming environments according to this invention also need language constructs that specify which simplifications should be done for any significance, as well as to access the information available at a significance. Moreover, determining which simplifications should be done comprises determining which function calls should be expanded. As will be described below, the systems and methods according to this invention introduce a programming form that specifies at what stage a function should be reduced. Essentially, a lambda expression acts like a data object until the stage where the lambda expression is reduced. At that point, the lambda expression acts like a function.

On the other side, the additional information provided by a significance is contained in the unreduced function calls. This information is accessed by a form that allows a program to test whether an expression's significance is a particular function's application. The expression's significance acts like an accessor to the function's data.]

An expression's significance always contains at least as much information as the value of the expression, because the significance is a stage toward determining the value. However, there can also be a use for other information about an expression, which is not on the line toward determining the value of the expression. This is the kind of information that typically results from flow analysis, such as data type information, whether this is the only reference to a value, and loop fusion decisions. To support this, the semantic-based aspect-oriented programming systems, methods and programming environments according to this invention use projections to encapsulate such information. A projection is defined relative to a significance and gives additional information, typically about the role of that significance in the rest of a given computation. The result of projection can be a value. However, the result can also be a significance of the stage the projection is on. This means that projections can remember snippets of a computation that can later be incorporated into the total computation.

Unlike a significance of an expression, which is basically local to the expression, a projection reflects that expression's role in the larger computation. This means that projections generally are not computed locally. Rather, the projections are computed using a technique akin to flow analysis. To support this, the semantic-based aspect-oriented programming systems, methods and programming environments according to this invention provide a mechanism called a "propagator". A propagator is run when a particular program element has been simplified to a suitable stage. The propagator will run on each matching significance and may examine and update one or more projections of such a matching significance and the arguments of any such matching significance. For example, a projection can be designed to count how many times an expression is used. The projection initially starts with a value of 0. Then, a propagator could be written for the application that takes the application, goes to each argument and increments the use count projection.

Propagators can do both upward and downward data flow. Upward propagators examine argument projections and update projections of the whole expression. In contrast, downward propagators examine projections of the entirety of a given expression and update the argument projections. A first propagator will be re-invoked should some other propagator update the projection that the first propagator has examined.

Propagators expose the sense of identity embedded in a particular significance because the propagators perform updates. When a propagator updates a projection of a given significance, that update will be seen only by other references to the same significance. Since propagators are defined on significances, the identity of a significance is what matters. The identity of the corresponding significance can change between successive significances by unfolding. That is, every time a function is unfolded, the significances in the body of the function are copied to the site of the application of the function.

Figure 2:
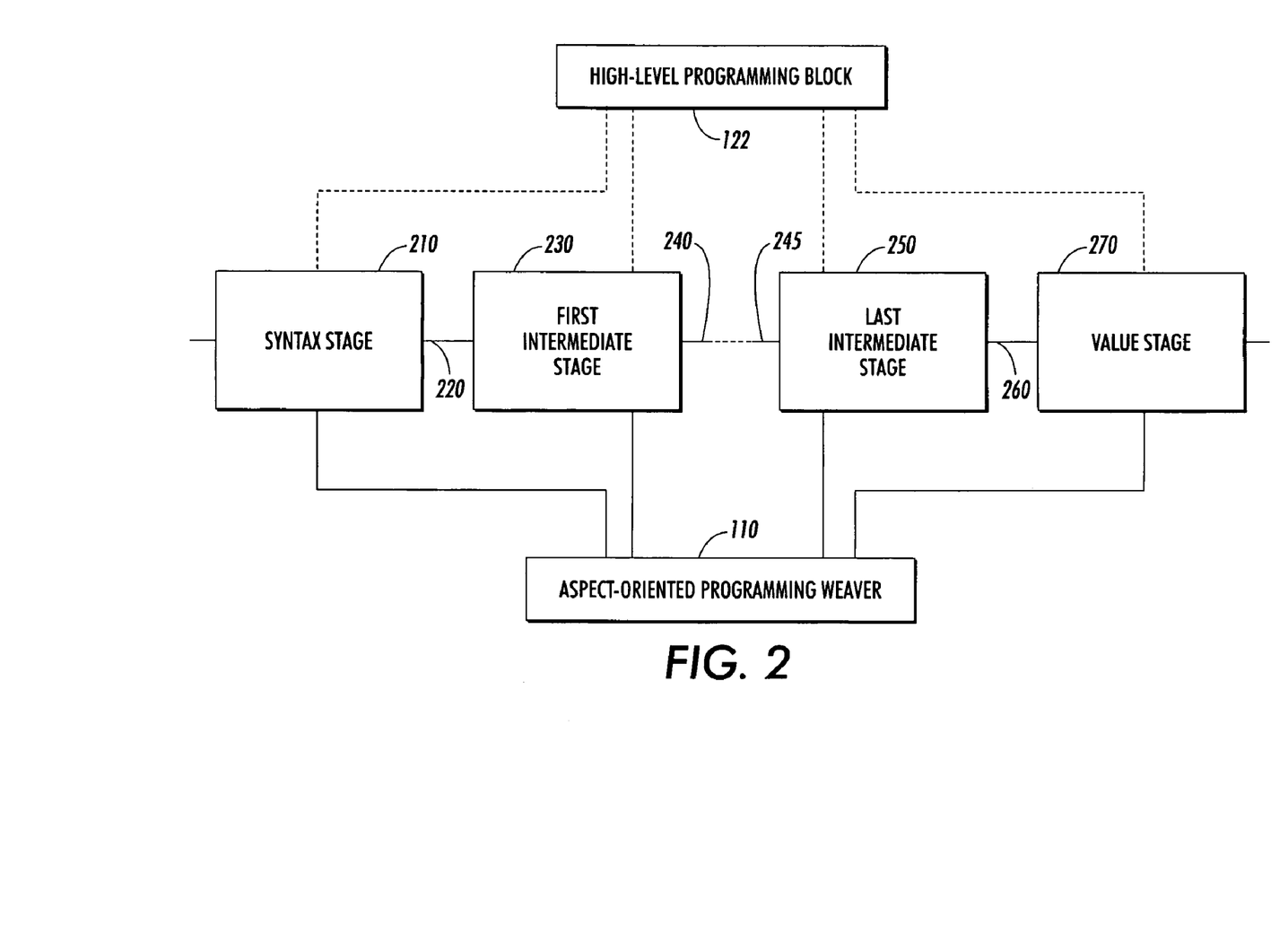
FIG. 2 illustrates one exemplary embodiment of the different degrees of processing, as represented by various stages of a programming element, in a semantic-based aspect-oriented programming environment according to the systems and methods of this invention.

As shown in FIG. 2, in the semantic-based aspect-oriented programming systems, methods and programming environments according to this invention, the weaving process is done through several stages. A given program element is simplified through successive stages of significance, of which many are done at compilation. The different degrees of processing are represented by the various stages, with the simplest weaving generating only two stages, i.e., a first stage and a final stage.

As shown in FIG. 2, in various exemplary embodiments, the first stage is a syntax stage 210. In this syntax stage 210, no local information from a given high-level code block 122 has been discarded and no contextual information is available. This corresponds to the original syntax of that high-level code block 122. In the systems, methods and aspect-oriented programming environments according to this invention, the aspect-oriented weaver 110 "weaves" the syntax stage 210 from the high-level code block 122. The syntax stage 210 includes a woven code block 220. The syntax stage 210 then outputs the woven code block 220 generated in the syntax stage 210 to a next intermediary stage 230. The next intermediate stage 230 is woven by the aspect-oriented weaver 110 from the woven code block 220. After each stage 210, 230, 250 and 270, one or more propagators, that have been defined in a corresponding woven code block 220, 240, or 260 relative to that stage 210, 230 or 250, are run to determine the projections defined in that stage 210, 230 or 250. These projections are then available during the following stages 230, 250 and 270, respectively.

As shown in FIG. 2, after the first stage 210 is woven, a first intermediate stage 230 is then woven. This tends to further optimize the program code contained in the high-level code block 122. As before, the woven code block 240 of this first intermediate stage 230 is input to a next intermediate stage. This repetitively occurs until a last intermediate stage 250 receives a woven code block 245 from the preceding intermediate stage (not shown).

It should be appreciated that all parts of a given program or set of program elements must move through each implemented stage 210, 230, 250 and 270 in unison. If some parts of the program or set of program elements are delayed, then the propagators that are doing the flow analysis will not have the required global access to the stages associated with the particular propagators. Likewise, if some parts of the program or set of program elements are accelerated, the accelerated parts will not have access to the propagator results of earlier stages.

As shown in FIG. 2, at the last intermediate stage 250, all optimization weaving is completed. The woven code block 260 output by this last intermediate stage 250 is input to the final weaving stage 270. It should be appreciated that the final weaving stage 270 is often the processed value stage. Then, the woven code output by from the final weaves stage 270 is compiled into an executable program module or set of executable program modules.

There are several challenges presented by staged execution. In particular, first class functions present one challenge because whether an application should be simplified for a given stage depends on whether the function that ends up in the function position is supposed to be reduced at that stage. However, that depends on the value of the expression. The expression may not be computed at the current stage. Often, there is no problem because the expression has been reduced to a value, i.e., a lambda expression, during an earlier stage of processing. For example, after the forms of some stages are reduced, what may be left is a lambda expression. The extreme case occurs when the functions are not first class functions. The references to these functions start out as values.

When an expression has not been reduced to a value, and the semantic-based aspect-oriented programming systems, methods and programming environments according to this invention need to know whether an application of that expression should be reduced, the semantic-based aspect-oriented programming systems, methods and programming environments according to this invention presume that the expression should not be reduced during the current stage. In fact, the semantic-based aspect-oriented programming systems, methods and programming environments according to this invention generally cannot reduce an application of that expression if they do not have the value of that expression.

When the semantic-based aspect-oriented programming systems, methods and programming environments according to this invention later do enough processing to determine the value of the expression, and the result turns out to be an expression that should have been reduced earlier, the semantic-based aspect-oriented programming systems, methods and programming environments according to this invention can report an error. In other words, in some exemplary embodiments the semantic-based aspect-oriented programming systems, methods and programming environments according to this invention enforce the requirement that a first class expression reduce to lambdas by the time the corresponding applications are supposed to be reduced.

It should be appreciated that it is most convenient if the code for the propagator is written in the same language as the program elements it is analyzing. That way, the propagator can take advantage of standard language constructs to examine the program elements, such as all of the routines that have been defined and computing results that are at intermediate significances.

Since propagators are written in the same language as the underlying program, the propagator can be executed in stages as well. However, in this case, relating the stages of the propagator to the stages of the underlying program or set of program elements becomes problematic. Since the intent is that a propagator runs when the underlying program or set of program elements reaches the appropriate stage, a propagator does not start running until the underlying program reaches the stage the propagator is working on. Then, in general, the propagator fully executes all of its stages.

For the propagator to be fully executed, while the program or set of program elements is at an intermediate stage, the propagator maintains an arms-length relationship to the program or set of program elements. The propagator will have variables that are bound to significances from the program or set of program elements. However, the propagator can only use those variables in restricted ways. First, the propagator is logically executed up to the stage that the propagator operates at, but without having access to the bindings of those variables. That is, such variables are essentially treated as unbound variables. Then, from the program or set of program elements, each of the variables is bound to the appropriate significance and the propagator finishes its execution. However, the propagator generally cannot request later significances from the variables bound to the program or set of program elements. Any attempt to access a later significance will, again, see such a variable as unbound. To allow the propagator to output significances as its result, the propagator can use a special form described below to surround code that should not be simplified beyond the significance the propagator is accessing.

Suppose that a programmer wants to write code that performs various operations on arrays. Typically, a programmer will write code that loops over arrays to produce new arrays. The programmer defines routines to do various primitive operations, and then builds higher level operations using the defined primitive operations. Frequently, the programmer uses the output array of one routine as the input array for another. In that case, the programmer would like to use a fused loop to do the combined operation. This avoids the high computational or resource cost of writing and then reading the intermediate array. This cannot be done in ordinary functional programming, because the first operation will have to be run before the second operation can be allowed run. Some optimizers might do the loop fusion automatically, but optimizers are typically opaque. That is, it becomes a matter of trial and error to get the code to optimize as intended. Unfortunately, the code then cannot be ported to other optimizers.

One conventional approach to creating routines that can fuse together uses macro systems, reflective systems or C++ style templates to write library code which outputs a program with fused loops. However, this approach has serious shortcomings. It forces the library programmer to work in terms of operations on program text, instead of operations on arrays. This "level shift" is difficult to implement, that is, program, is error prone and is difficult to debug. Worse yet, by operating at the program text level, the library code sees only the immediate textual use context of a library construct. Simplifications or global information that would naturally be provided by the language information are either unavailable or are available at a great inconvenience. All the burden for analyzing the use context falls on the library programmer.

Another conventional approach uses a delayed evaluation mechanism, so that a library routine, that would normally have returned an array, instead returns a description of how to compute the array. Library routines can then take these descriptions as arguments, yielding descriptions for the outputs of the libraries that compute with fused loops. When an actual array value is required, the description of the actual array is executed. If this approach is combined with a partial evaluator, the fusing may happen at partial evaluation time and only the loops are executed at run time.

This second conventional approach is awkward in its handling of the distinction between arrays and array descriptions and when to go from one to the other. It has the added disadvantage of relying on a potentially opaque partial evaluator to make sure that loop fusion decisions actually do occur before run time. However, it does do a better job of providing a library routine with information about its use context than the first conventional technique, because the second conventional technique passes along information about how a value can be computed. Unfortunately, if a routine also needs information about how the result of that routine will be used, then this second approach needs to be modified to pass continuation descriptions. In this case, this second conventional approach becomes very complicated to use.

If the programmer cares about when the loops are fused, the programmer will want to be able to direct the loop fusion. Then, the loop fusion will occur when and where the programmer intends it to. The programmer will also generally want to keep the program modular. In particular, the programmer will want to keep the code that handles the details of loop fusion separate from the code that describes the higher level computations. Thus, in various exemplary embodiments, the semantic-based aspect-oriented programming systems, methods and programming environments outlined above can be used to create a library of primitive operations in which the operations know how to fuse with each other and the fusion occurs when the library routines are used in combination.

The resultant code that uses the library routines might provide some instructions about fusion, but it should not be occupied with doing the fusion itself. In fact, it should be possible for the library code to be written by one programmer and the higher level code written by another programmer with the higher level code reusable across several applications. Thus, in various exemplary embodiments, the semantic-based aspect-oriented programming systems, methods and programming environments outlined above allows a library programmer to define routines so that they fuse together.

In various exemplary embodiments, the semantic-based aspect-oriented programming systems, methods and programming environments outlined above can be applied to loop fusion by asking what minimum facilities a library routine needs to be able to do loop fusion. Roughly, a potential loop needs to be able to ask, "If my input would have been computed by a loop, then give me the inside operation of that loop and the array it would have worked on, and I'll use that in my loop." An example of pseudo-code that says this is:

```
(define pointwise
    (lambda (fn arg)
        (case arg
            ((ptw-loop inner-fn inner-arg) (inner-fn inner-arg)
            (ptw-loop (lambda (x) (fn (inner-fn x)))
                    inner-arg))
            (else
                (ptw-loop fn arg)))))
```

Here, "pointwise" is a function that maps a function over an array, but "pointwise" knows about loop fusion. The case form says, "Would 'arg' have been computed by an expression of the form '(ptw-loop inner-fn inner-arg)'?" The syntax "(inner-fn inner-arg)" indicates that "inner-fn" and "inner-arg" are pattern variables versus "ptw-loop", which is a pattern constant. If the argument matches, then the function of the inner loop should be composed with the function from "pointwise". Then a single loop should be performed using the composed function. Otherwise, a simple loop is used. In particular, as indicated below "ptw-loop" can be defined to do the actual loop:

```
(define ptw-loop
    (lambda (fn input)
        (let ((result (new-array)))
            (dotimes ((i 0 99))
                (setf (elt output i) (fn (elt input i))))
            output)))
If this library code is used with the expression:
(define double
    (lambda (array)
        (pointwise (lambda (x) (* x2))
                array)))
(define double-plus
    (lambda (array)
        (pointwise (lambda (x) (+ x1))
                (double array))))
``` then the implementation of "double-plus" should be a single loop that doubles each element and then adds one.

The key to the definition of "pointwise" is the "would" in the case statement's meaning, "Would 'arg' have been computed by . . . " The case needs to test the loop that would have computed the argument. It is no good for the case to test the array that is the value of "arg". That is what would happen if "pointwise" were a function. However, this would also mean that "arg" has been processed too far. It is also no good for the case to test the syntactic argument of "pointwise", such as "array" or "double array". This is what would happen if "pointwise" were a macro. However, this would mean that "arg" has not been processed enough. In particular, "pointwise" wants to see through the superficial structure of its argument to the interesting information that is computed by a loop, without seeing all the way through to the resulting array.

Thus, "pointwise" needs to be something in between a function and a macro. In particular, "pointwise" needs its arguments to be partially processed so that "pointwise" can see the information that "pointwise" is concerned about. However, "pointwise" does not want its arguments fully evaluated, which tends to eliminate the very information "pointwise" cares about. Thus, in various exemplary embodiments, the semantic-based aspect-oriented programming systems, methods and programming environments outlined above recognize levels of processing between those extremes and provide access to those recognized levels of processing.

The basic forms, or statements and/or constructs, of the semantic-based aspect-oriented programming systems, methods and programming environments according to this invention are set forth below. The general form of the "case" statement of the semantic-based aspect-oriented programming systems, methods and programming environments according to this invention is:

case stage value (model (var*) exp*)*{(else exp)}.

In the "case" statement, each model is an expression. The variables are free in the model and are bound in the expression. The value is compared to each model in succession. The first model that matches the value has its expression chosen as the value of the case. The expression can access the variables of the model, which are bound to make the match.

The comparison is logically done between the specified significance of the value and the model. The comparison will be done no later than the specified processing stage. However, the comparison may be done earlier, if an earlier stage causes the value and the model to simplify to the specified stage, so that the significances of the value and of the model can be compared. Also, the simplifications of the expressions are done lazily. That is, the value and the model will not be simplified to a given stage if the value and the model are discarded at that stage.

The "if" statement, set forth below, provides additional syntactic structure for the statement "case value exp1 (nil ( ) exp3) (else exp 2))":

if exp1 exp2 exp3

The "deconstruct" statement, set forth below, provides additional syntactic structure for the statement "case stage value (model (var*) exp*) (else (error))":

deconstruct stage value model (var*) exp*

The statement "reduction stage" specifies that a call of the value of "exp" should be reduced at the specified stage:

reduction-stage stage exp

The application statement states that the function's body is reduced when its reduction stage is reached. This statement has no keyword, but simply starts with the expression that denotes the function "fn":

fn exp*

It is an error if the function does not simplify to a lambda expression by the time its reduction stage is reached.

The "lambda" statement defines a function:

lambda (var*{.var} {=>var}) exp*

The form "=>var" is used to bind the stated variable to the result of the defined function. Of course, the result of the current stage is not available, but the result of the previous stage is available. The projections of the previous stage may be consulted.

The statement "stage" declares a stage, and defines the declared stage to be later than the given stage.

stage name {:below stage}

The statement "projection" declares a projection that gives information about a stage:

projection name :depends-on stage

The declared projection will be defined on all terms normalized relative to that stage or to a later stage. The initial value of the projection is nil. The value of the declared projection can be updated by propagators.

The statement "propagator" operates to declare a function that produces propagators propagator stage {:bottom-up|:top-down} function Once terms have been reduced to normal form with respect to the stage, the declared function will be run on each term. The declared function can update projections defined on the stage or the stage itself, if the stage is constrained.

Generally, a propagator will examine projections of some terms and update others. The operation of the projector is assumed to depend on the projections that propagator examined, but did not update. If those projections are changed by other propagators operating on this stage, then this propagator is rerun. The hints ":bottom-up" and ":top-down" identify the most efficient order to execute the propagators in order to minimize the need for recomputation. A practical system will probably need other hints. Such other hints can include a hint about which projections a propagator examines and which that propagator updates. Such a hint would help ordering among propagators operating on the same stage. Another such hint can identify guaranteed bounds on which sub-terms might be updated. Such a hint would allow propagators to be run lazily, computing projections only as such projections are requested. This would speed up library compilation times that introduce projections, but only require propagators to run in the vicinity of calls to the libraries.

The terms that the propagator sees are lambda definitions, lambda variables, applications and case forms. If a lambda expression has been reduced, the propagator will see the result of the reduction. This effectively turns the program tree into a directed graph. In particular, at each point in the lambda body that referenced a lambda variable, the actual argument will appear, shared among what had been all variable uses. It should be appreciated that variables bound to significances are never seen by propagators, only the significances.

The statement "update" defines a form that may appear only during the execution of a propagator:

update old new

This statement updates the "old" value, which must evaluate to a term projection at the stage the propagator applies to, with the "new" value.

The statement "same frequency" defines a form that can occur only during execution of a propagator:

same-frequency exp

This statement returns true if the frequency of expression evaluation is the same as that of the term that the propagator is handling.

For an example of what this means, consider the following expression:

(let ((x (+1 2)))
(lambda (y) (*x y))

It should be appreciated that the "lets" commands or operations are expanded in the earliest stage of processing. Here, one argument of the multiplication term is the addition operation. The addition operation will not be executed the same number of times as the multiplication operation because of the intervening lambda. Propagators may need to be sensitive to this. The other case where the execution frequency is different occurs when a term in one case branch references a variable outside the case.

Another perspective is that because propagators execute before run-time, one invocation of a propagator may correspond to many invocations of the significance it processes. It is not an issue as long as all the sub-terms that the propagator processes are invoked once per invocation of the main term. However, as the example illustrates, that is not always the case. The propagator may need to be careful in updating information associated with a significance of a different frequency. The "same frequency" statement provides a way for propagators to detect this situation.

Figure 3A:
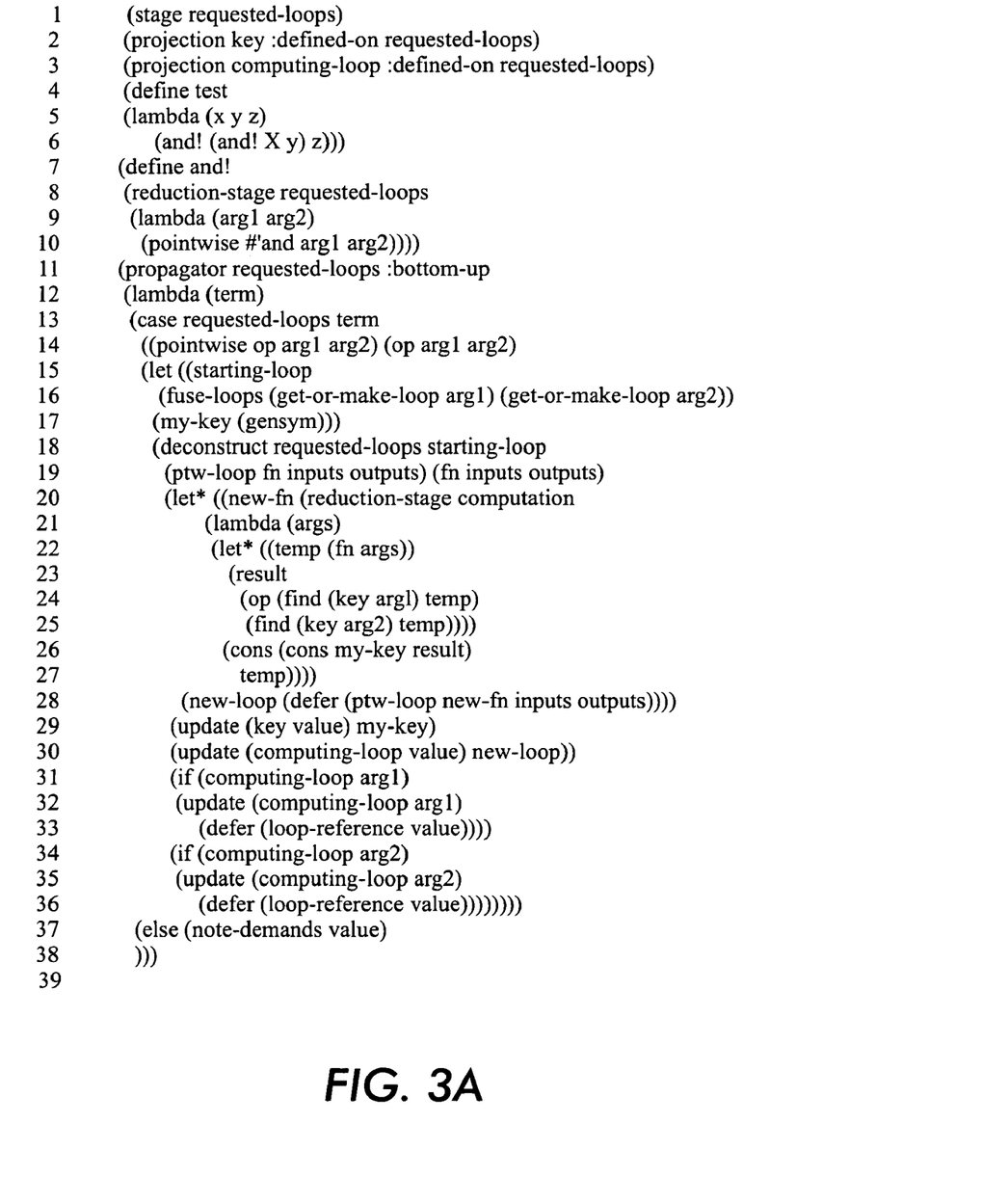
Figure 3B:
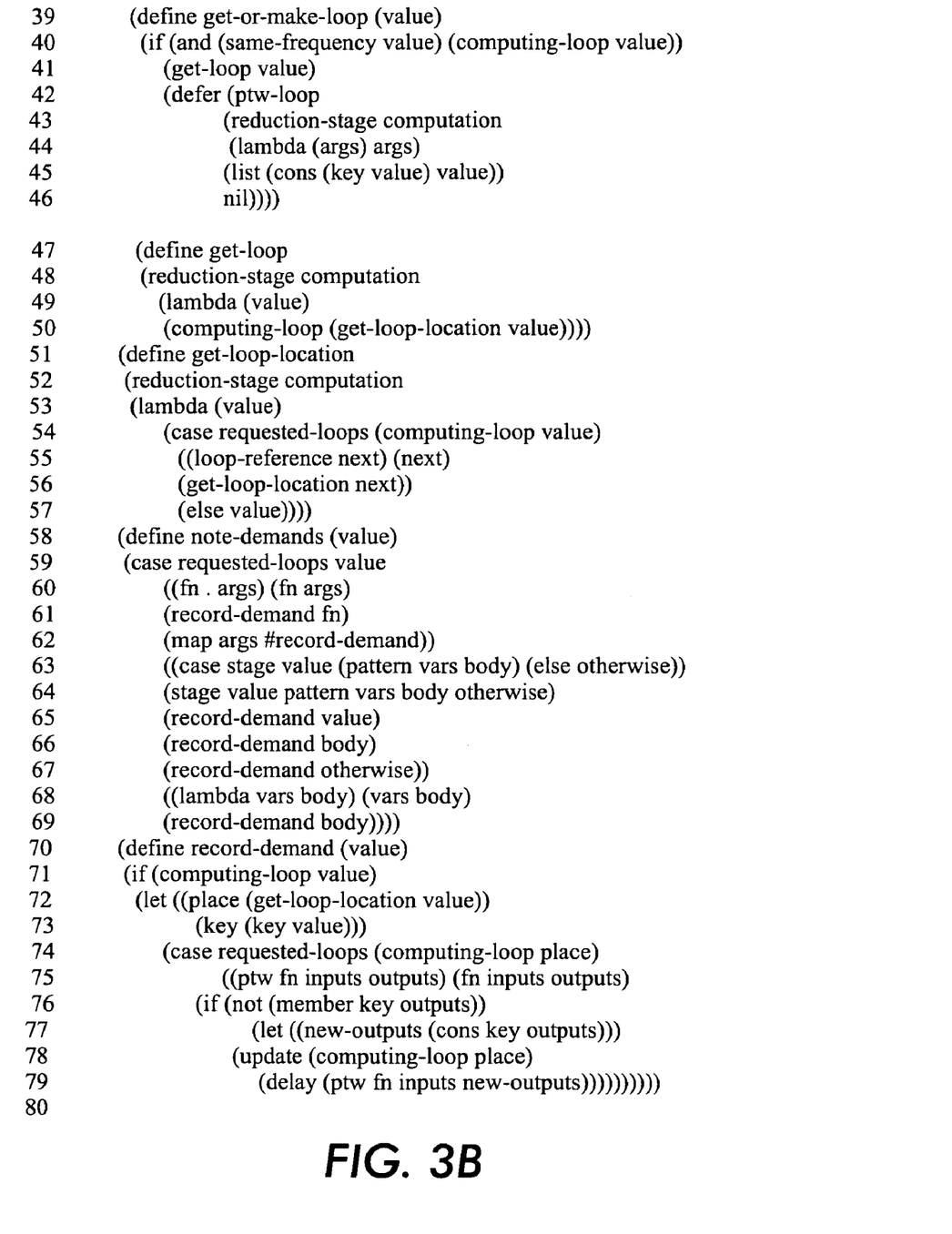

FIGS. 3A–3C set forth a sample code segment for performing loop fusion. This sample code handles many, but not all, cases where the result of one loop is used by several other loops.

Lines 1–3 describe the different information that flow processing can work on. This information includes three different significances of expressions and a unique identifier for the terms at the least simplified level. Line 2 defines the key for getting this value from a hash table. Line 3 defines the loop that will compute this value, among possibly others. To allow sharing, the projection defined in line 3 will only holds the loop for one of the values computed by the loop. The projection on the other values will hold (loop-reference value) for some other value computed by the loop. Following that chain will eventually lead to the value that holds the loop.

Lines 4–6 define the top level function. Lines 7- (end) define the subroutine library that defines reduced pointwise operations. Line 8 allows reduction of the lambda expressions at the top level, effectively making the definition of and! a macro. Lines 11–39 define a propagator that decorates each form with the loop that will compute its value. Line 37, when executed, indicates that the case is not "pointwise", allowing that the outputs are needed to be noted. Lines 39–46 return a pointwise loop that computes the value, and included making up a trivial loop if necessary. Lines 43 and 44 make the reduction reducible after loop fusion. Lines 47–50 indicate that, given that the value is computed by a loop, return that loop. Lines 51–57 return the value whose computing-loop holds the loop for computing the argument. Lines 58–69 record the form's demands for results. Lines 70–79 indicate that the actual array for the argument is required.

In lines 80–100, the structure of a pointwise loop, i.e., "ptw-loop", is designed to facilitate fusion, including generating loops with multiple values. To enable this, inputs and outputs are named with keys, so that the naming won't have to change under fusion. These keys exist only during loop fusion time. That is, these keys will be simplified away by run time. In line 93, the statement "fn" takes a list of key/value pairs to an augmented list of key/value pairs. The "inputs" is a list of key/array pairs, including the ids expected by "fn". The "outputs" is a list of keys, which must be among the keys fn outputs. The loop maps the function over corresponding elements of the arrays and returns a list of key/array pairs, with an entry for each key in output-ids. Lines 101–103 define the pointwise operation to return the proper result from the loop, constructed by the propagator in the previous stage, that computes its result.

Lines 104–117 return a loop that does the combined work of two pointwise loops, and combines their inputs and outputs. Line 115 indicates that the function defined inside is reducible after loop fusion. Lines 118–125 lookup a key in a list of pairs, assuming the key is there. Line 119 indicates that this is done before run-time. Lines 126 and 127 indicate that the operation to merge two lists is coded in a similar style to the operation to find an id in a list.

The basic operation of the weaver is: Start with the program. Simplify the program until all parts of the program have reached the first stage. Run the propagators for that stage to decorate the simplified program with projections. Now, simplify the program some more until all parts of the program have reached the next stage. During this simplification, the simplified program from the previous stage and the decorations added by the propagators are the data available to determine what the further simplified program will look like. This process is repeated until the final stage of the program is reached. Each part of the program has a significance at each stage. The question is whether any such part must be reduced from one stage to the next so that part of the program will properly denote the significance of that part of the program at that next stage.

Figure 4:
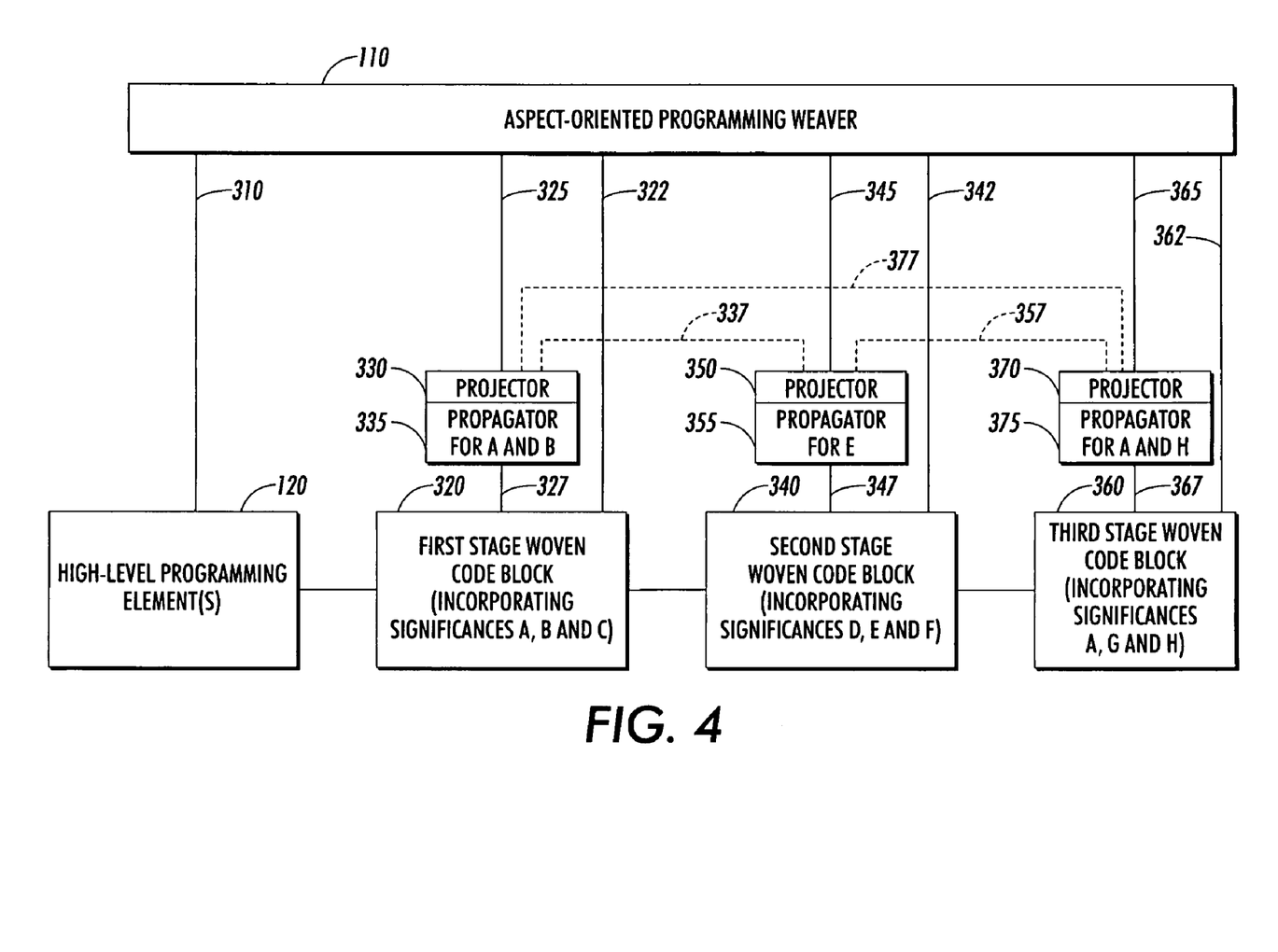
FIG. 4 illustrates in greater detail one exemplary embodiment of the relationships between the stages illustrated in FIG. 2.

FIG. 4 illustrates one exemplary embodiment of the relationships between the stages illustrated in FIG. 2 during program compilation, or weaving, using the semantic-based aspect-oriented programming systems, methods and programming environments according to this invention. As shown FIG. 4, a set of one or more programming elements 120 are input into the aspect-oriented weaver 110 to be compiled. The aspect-oriented weaver 110 examines the set of one or more programming elements 120 for common variables and operations and gives instructions 310 to reduce the set of one or more programming elements 120 to the appropriate significances. As shown in FIG. 4, three significances, A, B and C, are identified in the set of one or more programming elements 120. The three significances A, B and C are incorporated in the first-stage woven code block 320 generated as a result of a first stage analysis, corresponding to the first stage 210 outlined above with respect to FIG. 2.

Next, the aspect-oriented weaver 110 invokes a projector 330, by sending an instruction along an inter-propagator visibility path 325. The projector 330 examines the first-stage woven code block 320 and determines which of the significances A, B and C are susceptible to updating during further weaving. For example, in the exemplary embodiment shown in FIG. 4, the projector 330 identifies significances A and B as susceptible to updating. The projector 330 creates a propagator 335, along a projector/propagator path 327, to carry out any future updates on the significances A and B. The aspect-oriented weaver 110 then proceeds to the next stage of weaving.

In a second stage of weaving, the aspect-oriented weaver 110 uses the first-stage woven code block 320 as an input to a second or intermediate stage analysis, as outlined above with respect to FIG. 2. The aspect-oriented weaver 110 examines the first-stage woven code block 320 to identify any common variables and/or operations, and sends instructions 332 to reduce the first-stage woven code block 320 to the appropriate significances. As shown in FIG. 4, three significances, D, E and F, are identified in the first-stage woven code block 320. These three significances D, E and F are incorporated in a second-stage woven code block 340 generated as a result of the second-stage analysis, corresponding to the intermediate stage 230 outlined above with respect to FIG. 2.

Again, the aspect-oriented weaver 110 invokes a projector 350 by sending an instruction along an inter-propagator visibility path 345. The projector 350 examines the second-stage woven code block 340 for significances that may be effected by future weaving. For example, in the exemplary embodiment shown in FIG. 4, the projector 350 determines that the significance E fits this criteria. The projector 350 creates a propagator 355, using a projector/propagator path 347, for the significance E. Then, the propagator 355 communicates with the propagator 335 using an inter-propagator visibility path 337, to determine if anything needs to be updated. In this particular example, there are no significances in common. That is, there is no significance that is continued in both of the first and second stage woven code blocks 320 and 340. Therefore, no updating is needed.

Subsequently, in a third stage of weaving, the aspect-oriented weaver 110 uses the second-stage woven code block 340 as an input to a last stage analysis. As above, the aspect-oriented weaver 110 examines the second-stage woven code block 340 to identify any common variables and/or operations and sends instructions 342 to reduce the second-stage woven code block 340 to the appropriate significances. As shown in FIG. 4, three significances A, G and H, are identified in the second-stage woven code block 340. The three significances A, G and H are incorporated in a third-stage woven code block 360 generated as a result of the third stage analysis, corresponding to the final stage 270 outlined above with respect to FIG. 2.

Then, the aspect-oriented weaver 110 invokes a third projector 370 by sending an instruction along an inter-operability visibility path 365. The projector 370 determines that the significances A and H are susceptible to updating. A propagator 375 for the significances A and H is created by the projector 370, along a projector/propagator path 367. Then, the propagator 375 communicates with the propagator 355 along an inter-propagator visibility path 357. The propagator 375 determines there are no significances in common between the second-stage and third-stage woven code blocks 340 and 360 and that no updating is needed.

The propagator 375 also communicates with the propagator 335 along another inter-propagator visibility path 377, and determines that the significance A is common to the first-stage and third stage woven code blocks 320 and 360. Then, the propagator 375 updates all references to the significance A in the first-stage and third-stage woven code blocks 320 and 360. This ensures proper execution of the woven code later on. This process continues as discussed above until all of the code is fully woven and, therefore, fully optimized.

Figure 5:
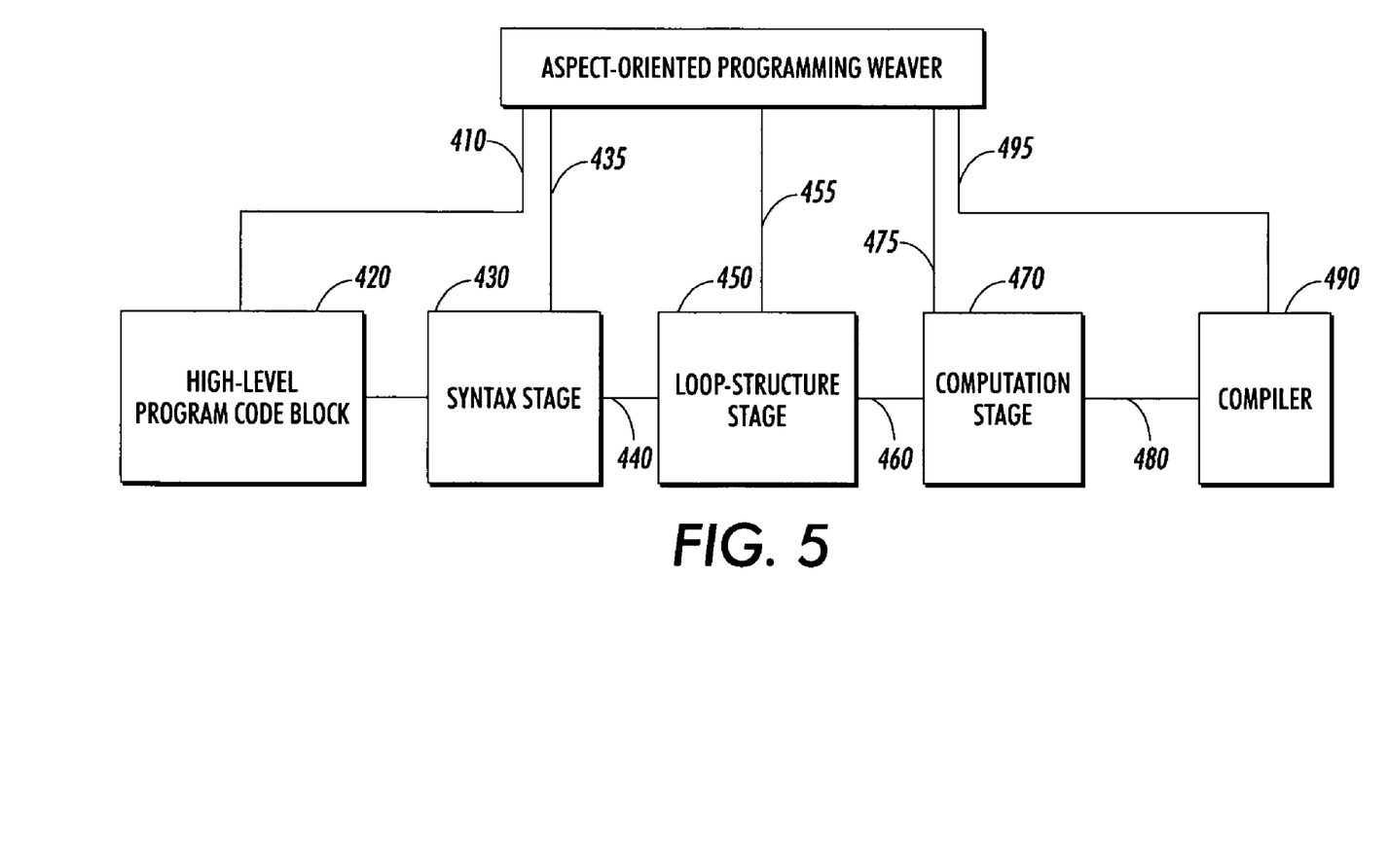
FIG. 5 illustrates one exemplary result when the semantic-based aspect-oriented programming environment according to the systems and methods of this invention are applied to loop fusion operations.

FIG. 5 illustrates the weaving process for the loop fusion example. The aspect-oriented weaver 110 provides instructions 410 to a syntax stage 430 to read in a high-level program code block 420. This high-level program code block 420 is provided to be used as the first stage code block in a first stage of the weaving process, i.e., the syntax stage 430. The aspect-oriented weaver 110 then examines first stage code block 420 in the syntax stage 430 to identify common variables and operations throughout the first stage code block 420. The aspect-oriented weaver 110 controls the syntax stage 430 using instructions 435. In this example, there are two intermediate stages between the syntax stage 430 and the final stage 480. The woven code block 440 output from the syntax stage 430 is input to a first intermediate stage 450, which in this exemplary embodiment can be referred to as a loop-structure stage.

Next, the aspect-oriented weaver 110 examines the first stage woven code block 440 and provides instructions 455 to the loop-structure stage 450. During the loop-structure stage 450, processing exposes the candidate loop structure of any arrays computed by the loops of the first stage code block 420. The loop-structure stage outputs a second stage woven code block 460. Unfortunately, the value of a particular loop is not directly computable from the loop-structure stage 450 because the loop structure performs explicit mapping functions over the arrays. In this situation, it is more desirable for the inner loop functions to be reduced before run time. Therefore, the loop structures need to be transformed to reduced loops. This transformation is provided by the computation stage 470.

Subsequently, the aspect-oriented weaver 110 provides instructions 475 to the computation stage 470 to reduce the loop structures contained in the second stage woven code block 460. In response, the computation stage 470 outputs the third stage woven code block 480, which is the final, fully woven stage. This final stage code block 480 is also called the value stage code block 480. The final stage code block 480 is then output to a compiler 490. The compiler 490, under control of the aspect-oriented weaver 110 over the signal channel 495, compiles the fully woven value stage block 480 to form an executable code block. The executable code block is output from the compiler 490.

In the loop fusion example outlined above, for each function definition, the programmer needs to determine at what stage the function definition should be processed. Similarly, for each case, the programmer can say at what stage that case expects to examine the term of that case. Expressing this in corresponding pseudo-code yields:

```
(define pointwise
    (reduction-stage loop-structure
        (lambda (fn arg)
            (case loop-structure arg
                ((ptw-loop inner-fn inner-arg) (inner-fn inner-arg)
                (ptw-loop (reduction-stage compilation (lambda (x) (fn (inner-fn x))))
                    inner-arg))
                (else
                    (ptw-loop fn arg1))))))
(define ptw-loop
    (reduction-stage computation
        (lambda (fn input)
            (let ((result (new-array)))
                (dotimes ((i 0 99))
                    (setf (elt output i) (fn (elt input i))))
                output))))
(define double
    (reduction-stage loop-structure
        (lambda (array)
            (pointwise (reduction-stage compilation (lambda (x) (* x2)))
                array))))
(define double-plus
    (reduction-stage loop-structure
        (lambda (array)
            (pointwise (reduction-stage compilation (lambda (x) (+ x1)))
                (double array)))))
```

Here the "(reduction-stage loop-structure . . . )" forms indicate which library routines should be reduced during the loop-structure stage. Reducing a routine during a stage does not mean fully evaluating the routine during that stage. It only means that calls to the routine should be logically replaced by copies of the body of that routine, so that the actual arguments of each call becomes visible inside the copy of the body and the routine's results become visible at each call site. Each form inside a routine determines its own reduction stage. Thus, the case operation in "pointwise" must indicate that it wants to examine its argument after the result of loop-structure stage reductions. Meanwhile, all the functions intended to execute inside loops need to indicate that these functions should be unfolded at the compilation stage, so that these functions will be reduced before run time. The arithmetic operations inside those routines have no associated declaration and, therefore, will run at runtime.

It is up to the programmer to make sure that information is available when it is needed. This is why the definition of "ptw-loop" indicates that this routine should also be reduced at the computation stage. With no declaration, this routine would not have logically unfolded until runtime. In that case, the value of "fn" would not have been known until runtime. Consequently, it would have been impossible to reduce the inside functions at compile time as requested. Subsequently, this would have led to an error.

However, there is a problem with the library outlined above. Consider the following pseudo-code written against the library:

```
(define misc
    (reduction-stage loop-structure
        (lambda (array)
            (let ((temp (double array)))
                (let ((p1 (pointwise (reduction-stage compilation (lambda (x) (+ x1)))
                    temp))
                (p2 (pointwise (reduction-stage compilation (lambda (x) (+ x2)))
                    temp))
                . . .))))
```

In this pseudo-code, "temp", the result of "double", is used as the argument to calls to two instances of "pointwise". As the library is written, each of those calls to "pointwise" will generate its own loop. The net result will be two loops, one for the call labeled "p1" and one for the call labeled "p2", of which both will do their doubling. If "temp" is used elsewhere below, there could even be a third loop that computes just "temp". The best situation would be a single loop that computes both the p1 array and the p2 array.

The problem here is that each time the "pointwise" library fuses a loop, "pointwise" calls for a new work execution of its argument's loop. If the argument is shared, the result is a duplicated computation. One solution to this is not to fuse loops if the argument is shared. Another is to make a single loop that accounts for all uses of the shared argument, one that would produce both the p1 array and the p2 array.

Adopting either of the above solutions requires knowing information about how the argument is used elsewhere in the program. That means that the library code needs access to some information about the broader context than just its immediate arguments. It needs some kind of data flow information concerning its arguments. This requires more language facilities.

To implement the simpler answer, where it does not fuse if the argument is shared, the library code needs to ask something like, "Is the argument that I'm being passed is it also being used elsewhere?" It should be appreciated that this question cannot be answered by simply looking at the code that computes the argument, no matter at what stage. The answer to this question lies in how the argument is used, not how it is computed. Further, the answer to this question relies on a sense of argument identity, that is, of what it means for the same argument to be used elsewhere.

To support this, thus, in various exemplary embodiments, the semantic-based aspect-oriented programming systems, methods and programming environments outlined above support the notion of term projection. A projection provides information about a term, typically information that is not available from the term itself, but from the context of its use. Thus, in various exemplary embodiments, the semantic-based aspect-oriented programming systems, methods and programming environment outlined above introduce another construct, the propagator described above, to calculate projection context information. The propagator is a form that is matched against the terms of an appropriate stage and then allowed to post information about projections of the term or sub-terms of the term. Initially, the value of a projection is set to a default that indicates that the term occurs in an empty context. As propagators run, they fill in the picture of the context. Thus, while a propagator is coded imperatively, it acts to incrementally raise the bound on the context of a term.

The following pseudo-code computes whether a term is used more than once:

```
(projection uses :defined-on operations)
(propagator operations
    (lambda (value)
        (case operations value
            ((fn. args) (fn args)
                (increment-count fn)
                (map (lambda (arg) (increment-count arg))
                    args))))))
(define increment-count
    (lambda (value)
        (update (uses value) (+ 1 (or (uses value) 0)))))
```

To make this example work, it is necessary to introduce a new stage, an operations stage, that occurs before the loop fusion stage. Definitions, like "double" that are combinations of loops, are reduced at this stage, so that the uses of loop results become visible. That way, there is no need for long range flow analysis. A form does not have to be followed through several procedures, because the only things that matter are the procedures that the programmer cares about. Those are the procedures that have access to the form structure at the loop-structure determination time which are the procedures that directly receive it.

However, this mechanism can perform long range flow analysis. It does this by accumulating information along the way and propagating it. In fact, this mechanism is enough to express the second approach to sharing, the generation of a single large fused loop, as discussed above with respect to FIGS. 2 and 3.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for simplifying an aspect-oriented programming element embodied on a recordable medium that is compilable into instructions for operating a data processing device, the programming element having at least one part, comprising:
    simplifying the programming element by reducing the programming element to a canonical expression until all of the at least one part of the programming element reaches a first simplification stage to create at least one part of a current stage simplified programming element;
    determining at least one propagator for the current stage simplified programming element, the propagator being a form that is matched against terms of an appropriate stage and posting information about projections of one or more of the terms, and being described in the programming element, the propagator incrementing the value of the projections,
    associating at least one projection with the current stage simplified programming element using the at least one determined propagator, the at least one projection giving information about the role of a mathematical expression in the simplification of the programming element;
    simplifying the current stage simplified programming element, based at least in part on the current stage simplified programming element and the associated projections, until all of the at least one part of the current stage simplified programming element reaches a next stage to create a next stage simplified programming element.

2. The method of claim 1, further comprising compiling each stage obtained from the programming element into at least a portion of the instructions for operating the data processing device.

3. The method of claim 1, further comprising repeating the determining, associating and current stage simplifying steps using the next stage simplified programming element as the current stage simplified programming element.

4. The method of claim 3, wherein repeating the determining, associating and current stage simplifying steps comprises repeating the determining, associating and current stage simplifying steps until the next stage simplified programming element is a final stage of the programming element.

5. The method of claim 1, wherein associating the at least one projection with the current stage simplified programming element using the at least one determined propagator comprises using the at least one determined propagator to decorate the current stage simplified programming element with the at least one projection.

6. The method of claim 1, wherein each simplified programming element has at least one significance, and simplifying the current stage simplified programming element comprises determining whether, for each of the at least one part of the current simplified programming element, that part of the current simplified programming element should be reduced so that the next stage simplified programming element properly denotes the at least one significance of that part of the current simplified programming element in the next stage simplified programming element.

7. A method for executing an aspect-oriented computation on a data processing device described as a plurality of language constructs, comprising:

determining at least one propagator for the computation, the propagator being a form that is matched against terms of an appropriate stage and posting information about projections of one or more of the terms, and being included in the language constructs and incrementing the value of the projections;

generating a projection on the computation using the propagator, the projection specifying a second computation and giving information about the role of a mathematical expression in simplifying the language constructs;

executing the computation until a portion of the computation that is conditional on a result of the projection is reached;

simplifying the language constructs describing the computation, by reducing the language constructs to canonical expressions, sufficiently to allow the second computation specified by the projection to be executed;

executing the second computation to obtain the result for the projection; and continuing the execution of the computation based on the obtained result for the projection.

8. A method for converting an aspect-oriented programming element into a plurality of woven code blocks, the woven code blocks compilable into instructions for operating a data processing device, comprising:

(a) identifying at least one of at least one common variable and at least one common process in the programming element;

(b) reducing the programming element to at least one significance based on the identified at least one of at least one common variable and at least one common process, the at least one significance comprising a canonical expression;

(c) incorporating the at least one significance into a first woven code block;

(d) determining zero, one or more of the incorporated significances that are susceptible to updating in subsequent steps of the method;

(e) invoking a propagator, based upon results of the determination, usable to perform any desired updates on the determined susceptible significances of the first woven code block, the propagator being a form that is matched against terms of an appropriate stage and posting information about projections of one or more of the and incrementing the value of the projections, the projections giving information about the role of a mathematical expression in reducing the programming element;

repeating steps (a)–(e) at least once to create a subsequent woven code block based on the immediately previously created woven code block, further comprising:

(f) communicating with the propagator of at least one previously created woven code block to determine if any significances of that at least one previously created woven code block are common to the subsequent woven code block; and (g) updating any significances in at least one of the subsequent woven code block and at least one previously created woven code block that are common to the subsequent woven code block and that at least one previously created woven code block.

* * * * *